(12) United States Patent
Volk et al.

(10) Patent No.: US 9,776,121 B2
(45) Date of Patent: Oct. 3, 2017

(54) FILTER ELEMENT, PARTICULARLY AIR FILTER ELEMENT, AND FILTER SYSTEM HAVING A FILTER ELEMENT

(71) Applicant: Mann+Hummel GMBH, Ludwigsburg (DE)

(72) Inventors: Mathias Volk, Otterstadt (DE); Thomas Pemsel, Ludwigsburg (DE); Andreas Scope, Oberschoena (DE); Ina Unger, Hemmingen (DE); Michael Fasold, Auenwald (DE); Dieter Weiss, Gefrees (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 0 days.

(21) Appl. No.: 14/941,781

(22) Filed: Nov. 16, 2015

(65) Prior Publication Data
US 2016/0129383 A1    May 12, 2016

Related U.S. Application Data

(63) Continuation of application No. PCT/EP2014/056456, filed on Mar. 31, 2014.

(30) Foreign Application Priority Data

May 17, 2013  (DE) .......................... 10 2013 008 389

(51) Int. Cl.
B01D 53/02    (2006.01)
B01D 46/00    (2006.01)
(Continued)

(52) U.S. Cl.
CPC ...... *B01D 46/0036* (2013.01); *B01D 46/2411* (2013.01); *B01D 46/30* (2013.01);
(Continued)

(58) Field of Classification Search
CPC ........ B01D 2253/102; B01D 2253/106; B01D 2253/108; B01D 2253/11;
(Continued)

(56) References Cited

U.S. PATENT DOCUMENTS 4,227,904 A    10/1980  Kasmark, Jr. et al.
5,120,331 A    6/1992   Landy
(Continued)

FOREIGN PATENT DOCUMENTS

DE    4311297 A1     10/1994
DE    19540876 A1    5/1997
EP    0045516 A1     1/1982

*Primary Examiner* — Christopher P Jones
(74) *Attorney, Agent, or Firm* — James Hasselbeck (57) ABSTRACT

The invention relates to a filter element (10), including a filter body (12) with a self-contained exterior side (50) which surrounds a self-contained interior side (52), at least one filter medium (16) being disposed between exterior side (50) and interior side (52) and the filter body (12) including at least in some areas at least one winding layer (14) with at least one adsorbent. The invention relates furthermore to a filter system (100) with a filter element (10) with a filter body (12) with a self-contained exterior side (50) which surrounds a self-contained interior side (52), at least one filter medium (16) being disposed between exterior side (50) and interior side (52), the filter body (12) including at least in some areas at least one winding layer (14) with at least one adsorbent.

12 Claims, 10 Drawing Sheets

(51) Int. Cl.
*B01D 53/04* (2006.01)
*F02M 35/024* (2006.01)
*B01D 46/24* (2006.01)
*B01D 46/52* (2006.01)
*B01D 46/30* (2006.01)
*B60H 3/06* (2006.01)
*H01M 8/0662* (2016.01)

(52) U.S. Cl.
CPC ....... *B01D 46/528* (2013.01); *B01D 53/0415* (2013.01); *B01D 53/0431* (2013.01); *B60H 3/0608* (2013.01); *F02M 35/02483* (2013.01); *H01M 8/0687* (2013.01); *B01D 2253/102* (2013.01); *B01D 2253/106* (2013.01); *B01D 2253/108* (2013.01); *B01D 2253/11* (2013.01); *B01D 2253/116* (2013.01); *B01D 2253/1124* (2013.01); *B01D 2253/34* (2013.01); *B01D 2259/4566* (2013.01); *B01D 2275/105* (2013.01); *B60H 2003/0691* (2013.01); *H01M 2250/20* (2013.01); *Y02T 90/32* (2013.01)

(58) Field of Classification Search
CPC ...... B01D 2253/1124; B01D 2253/116; B01D 2253/34; B01D 2259/4566; B01D 2275/105; B01D 46/0036; B01D 46/2411; B01D 46/30; B01D 46/528; B01D 53/0415; B01D 53/0431; B61H 2003/0691; B60H 3/0608; F02M 35/02483; H01M 2250/20; H01M 8/0687
See application file for complete search history.

(56) References Cited

U.S. PATENT DOCUMENTS

| | | |
|---|---|---|
| 5,897,779 A | 4/1999 | Wisted et al. |
| 6,294,090 B1 | 9/2001 | Nussbaumer et al. |
| 6,489,052 B1 | 12/2002 | Acker |
| 7,101,419 B2 | 9/2006 | Dallas et al. |
| 7,476,268 B2 | 1/2009 | Maier et al. |
| 2010/0044297 A1 | 2/2010 | Krogue |

FILTER ELEMENT, PARTICULARLY AIR FILTER ELEMENT, AND FILTER SYSTEM HAVING A FILTER ELEMENT

TECHNICAL FIELD

The present invention relates to a filter element, in particular, for use as an air filter, and a filter system having such a filter element.

BACKGROUND OF THE INVENTION

A filter element for a fuel cell is known from the publication EP 1349 638 B1 in which activated carbon is used as an adsorbing filter medium. For example, a bed of activated carbon in a cylindrical filter is proposed. The filter element is connected upstream of a fuel cell and is used to clean the cathode air.

An object of the present invention is to create a robust filter element, in particular, for filtering air.

A further object of the present invention is to provide a filter system having such a filter element.

According to one aspect of the present invention, the previously mentioned objects are achieved by a filter element having a filter body, which has, at least in sections, a wound layer having at least one adsorbent, as well as, according to another aspect of the present invention, a filter system having such a filter element.

Advantageous embodiments and advantages of the present invention result from the additional claims, the description and the drawings.

SUMMARY OF THE INVENTION

A filter element is proposed which has a filter body having a closed outer face, which surrounds a closed inner face, and the inner face encloses a central flow chamber, and at least one filter medium is situated between the outer face and the inner face, and the filter body includes, at least in sections, a wound layer having at least one adsorbent.

Advantageously, wrapped layers or wound layers not having separate creases, such as they occur in pleated filter bodies or when using embossed filter media, or defined flow channels, are designed to facilitate the manufacturing and handling of the filter elements. The filter element does not require a mutual closure of the air ducts, facilitating the manufacturing. Conventional filter elements having filter bodies made out of pleated filter media do not provide, based on the high flow speed, the required contact time ensuring a reliable adsorption or absorption of contaminants into the filter, which is critical for the functionality of a filter for gas purification or filtration efficiency and/or adsorption efficiency. In particular, this applies to filter elements having a high flow rate of the medium to be filtered, for example, in fuel cell systems, particularly in fuel cell systems of higher power classes, for example, motor vehicles or stationary applications. The design having wound layers provides the filter element with a sufficiently high contact time of the medium to be filtered with the adsorbent which, in this instance, may clean the medium to be filtered.

In addition to the thickness of the winding, that is, the filter element, resulting from the number of wound layers in the filter element and the thickness per wound layer, the shape of the winding filter is also variable. In addition to the conventional circular shape, other cross sections, such as elliptical, rectangular or polygonal shapes are also possible. These shapes may easily be produced by unwinding a flat carrier body onto a suitable inner core. In doing so, an optimal use of the installation space is provided.

The design of the filter element is uncomplicated and robust and enables long service life during use. Furthermore, filter characteristics, for example, through a targeted distribution of additional components, may be specified in the at least one wound layer in the radial and/or also in the axial direction of the filter element.

In particular, the filter element may be an air filter element.

The at least one adsorbent may include at least one material from the group of activated carbon, zeolites, silica gels, metal oxides, molecular sieves, phyllosilicates and nanoclays.

In general, adsorbent layers regarding the material selection (for example, activated carbon type, zeolites, silica gels, metal oxides such as aluminum oxide, copper oxide or manganese oxide, molecular sieves such as MOFs (MOF=metal organic framework), phyllosilicates, and nanoclays) and/or their weight per unit area may be chosen to realize a specific adaptation to the adsorption task. Nano particles made out of mineral sheet silicates are referred to as nanoclays.

An appropriate surface weight range per wound layer is between at least 10 $g/m^2$ to 4000 $g/m^2$, preferably between at least 100 $g/m^2$ to 2000 $g/m^2$.

According to an advantageous further refinement, the filter body may include a carrier body, upon which a layer having at least one adsorbent is applied, and by winding the carrier body, for example, onto a suitable inner core having the desired diameter and desired cross section, it may retain its form, for example, by winding onto a cylindrical inner core having a circular cross section. In doing so, the carrier body may, for immobilizing the adsorbent, be made up, for example, of two layers of band-shaped carrier material between which an adsorbent layer is situated, or also of a single layer of band-shaped material on which the adsorbent may be immobilized in an appropriate manner. In this instance, the immobilization of the at least one adsorbent may be carried out in different ways, for example, by embedding into an adhesive, contacting with adhesive thread, adhesive dots, adhesive foils and the like.

The adsorbent may be used in any form, for example, as an arbitrarily shaped granulate, a defined formed granulate (in spherical form, rod shape, etc.), a powder or the like. Likewise, the at least one adsorbent may be appropriately impregnated and/or mixed with other adsorbents and/or absorbents to, for example, read out and/or neutralize and/or relocate undesirable, chemical components from the medium to be filtered. In this instance, respective components may be distributed in an appropriate manner onto the carrier body before winding so that after the winding, for example, a plurality of layers specifically include a first component, followed by a further wound layer having different or additional components, or the distribution may be selected so that a gradient results in the radial direction in the filter element by one or a plurality of components.

In particular, at least two adsorbents and/or absorbents may be applied one after the other and, for this reason, a different adsorbent or absorbent is situated in the radially seen inner region of the winding (for example, across a few layers) than in the radially seen outer region of the winding. In this instance, it is not mandatory that the adsorbents or absorbents are applied to the same or to a one-piece carrier body and/or cover medium.

The winding may be designed in such a manner that wound layers having different surface weight ranges are radially following in sequence to achieve a desired adsorption effect. In doing so, for a, for example, specified target gas, which is obtained as a filtered medium on the clean side, a clearly specified amount of optimized adsorbent (impregnated activated carbon, zeolite, silica gel, metal oxide such as aluminum oxide, copper oxide, manganese oxide, molecular sieves such as MOFs, phyllosilicates, and nanoclays) may be used in one wound layer. In contrast to a classic adsorbent bed or an adsorbent foam, for example, an activated carbon foam, a defined position on the inflow side and/or the outflow side of such a wound layer is realized. The targeted positioning of defined adsorbent layers enables to react to situations in which specific gas molecules are preferably absorbed on the inflow side and other gas molecules preferably on the outflow side.

A single adsorbent layer may also be realized from mixtures of various adsorbents (for example, different impregnated activated carbons, zeolites, silica gels, metal oxides such as aluminum, copper, or manganese oxide, molecular sieves such as MOFs, phyllosilicates, and nanoclays).

The carrier body is intended to immobilize component particles, for example, adsorbent particles, and to stabilize the winding structure of the filter element. For example, a nonwoven fabric is well suited for this purpose. Advantageously, such nonwoven fabric layers may also take over a part of the particle filtration. For higher particle separation efficiency from the medium to be filtered and dust retention capacities, it is useful to specifically implement the carrier body in the winding as a particulate filter layer. Instead of spunbonded fabrics, fine fiber layers (for example, so called meltblown fabrics) or microfiber and nanofiber layers (for example, manufactured by way of electrospinning) may be used for this purpose. The particulate filter layer in itself may be made up of a plurality of nonwoven fabric layers or fiber layers. These particulate filter layers may be used in the winding on the inflow and/or outflow side and/or as a carrier body for the adsorbent as intermediate layers between the adsorbent layers.

Furthermore, combining the wound carrier and adsorbent layers with an additional particulate filter element (in particular, when pleated) is possible.

By implementing, for example, nonwoven fabric layers as a particle filtering layer and as a carrier body for the adsorbents, a particle separator may be integrated into the wound layer arrangement. Alternatively or additionally, further filter elements having additional functions may be coupled at an inner face and/or outer face of the filter bodies, for example, as a coating over the inner face and/or the outer face.

In this instance, the wound layers having at least one adsorbent may be structured in the following advantageous versions:

a. A carrier body having one adsorbent of a specific type, for example of a specific activated carbon type, and a cover medium to cover the one adsorbent;
b. The carrier body having a mixture of adsorbents from a plurality of different adsorbent types, for example, a plurality of active carbon types, and a cover medium to cover the adsorbents;
c. The carrier body having at least two layers of different adsorbents and a cover medium to cover the adsorbents;
d. One of the versions a through c without a cover medium to cover the adsorbents;
e. One of the versions a through c with or without a cover medium to cover an adsorbent, for example, activated carbon, with other adsorbents and/or absorbents, for example, molecular sieves and the like. This arrangement results, in the cross sections of the winding, in permanently changing adsorbent layers or absorbent layers having different characteristics, which may be customized as needed when manufacturing the filter element.

According to an advantageous further refinement, the wound adsorbent layer may have a sealing at its edges. In this instance, the sealing of the longitudinal edges of the carrier body may form an end plate located at the end face. This end plate may be already formed when winding the carrier body. In this way, a sealing via a closure element may be carried out along the longitudinal extension of the carrier body at both lateral ends of the flat layer. For example, a closure element may be formed by an adhesive, a foam, a thermoplastic, a clamp, a welding process or a combination of the aforementioned possibilities. The use of a hot melt adhesive during the winding process is also conceivable if the subsequent wound layer winds onto the previous wound layer and the hot melt adhesive is still sufficiently liquid in the peripheral area to sealingly connect to the adhesive of the previous wound layer.

The sealing at the end faces of the filter element may also occur by a retroactive, thermoplastic deformation in that a sealing element is melted and deformed onto the respective end face. The melting may be carried out by ultrasound, heating mirrors, infrared rays and hot air and the deformation by pressing the sealing element onto the end face and over its outer edge.

As a further option, a separate end disk may be used, as they are known from oil or fuel cell filter elements.

A sealing of the ends of the carrier body, that is, of the axial edges of the first and/or last wound layer in the wound-up state, may also be carried out by the methods listed above. In doing so, the flow around the at least one adsorbent in the wound layers of the filter element may be ensured and leakages may be prevented.

Appropriately, the end areas of the wound layers may be fixed at the outer shell and/or inner shell of the wound-up filter element. The fixing may be designed over a length and/or width of a few millimeters, preferably approximately 5 millimeters, to a plurality of centimeters. The fixing may be carried out by adhesion of the outermost and/or innermost wound layer onto the wound layer situated below and fixed by way of sealing, or by additional fixing elements such as glue, fixing nets, fixing lattices, elastic bands, a cylindrical element permeable for the medium to be filtered (for example, a lattice, filter material or porous solid material), clamps or fibers integrated into the wound layer, wires, etc., which then in their extension are wrapped at least once completely around the entire winding of the filter body and having the wound layers (filter layer or fiber wire layer) situated underneath. This may be carried out, for example, by welding, adhesion, interlacing, sewing, etc.

According to an advantageous further refinement, the filter body may be fluidly coupled to at least one particulate filter. Alternatively or additionally, the filter body may be fluidly coupled to at least one aerosol filter. These may be exchanged independently from the filter element in a filter system.

For separating particles, for example, a particle separator medium may, in this instance, be applied onto the surface shell of the winding in form of a flat layer or as a folded, in particular, pleated design, which optionally may be provided with the same seal (sealing) or another sealing of the end face sealings described above or may be pinned or slipped onto the winding as a separate element. When the element is designed in a folded (pleated) manner, the end face may also be sealed by a side tape, a foil or a curing adhesive layer. In order to ensure that no particles are swept out of the chemical filter by the medium to be filtered, a particle separator element may optionally be integrated as a safety element (also known as secondary element or "police filter") in the discharge direction, for example, in the core of the winding for a flow direction through the filter element from the outside to the inside, which is directly attached in front of the outlet of the medium to be filtered or, for example, represents the innermost layer of the winding. In this instance, the particle separator may be introduced as a separate element or as an integrated variation, and, in the integrated variation, a special material or, optionally, the carrier body may be used as particle layer. In the variation of the particle separator element being directly attached in front of the outlet of the medium to be filtered, the particulate filter may be connected, for example, to a one-piece connector element, for example, by way of welding, or by a multi-piece connector element, for example, by adhesion, clamping or pressing (for example, an open-pored foam). In particular, the particulate filter may be made up of an open-pored foam which is elastic and, owing to this characteristic, self-sealing.

According to an advantageous further refinement, the filter element may be designed substantially housingless in such a manner that the filter element includes a through-flowable outside. In this instance, the flow direction may be specified as needed from the inside to the outside or from the outside to the inside. Designing the filter element without a housing makes its manufacturing particularly cost effective and the filter element respectively lightweight and compact.

Despite the housingless architecture, the realization of an advantageous connection geometry to the filter element may be carried out with little effort via a socket element which protrudes more or less from an end face into the winding of the filter body and is connected to the end face sealing of the winding in an airtight manner. Depending on the depth of penetration of the socket element into the winding, it may be appropriate, regarding the stability of the filter element, to mold a support surface to the socket element upon which the end face of the winding rests. Depending on the design of the socket element, a protrusion into the winding may be completely omitted if a sufficiently tight connection of the end face sealing with the socket element may be achieved. Optionally, a respective socket element may also be attached at both end faces, and then the second socket element does not necessarily have to have the same measurements as the first socket element. For further contacting, the socket element may be provided with a suitable connector structure, for example, a pine tree profile or a comparable plug-in geometry, a bayonet closure, a screw thread having an axial or radial seal, and the like. In this instance, using a typical quick connector is also possible, and the socket element then either constitutes or includes the quick connector, or even constitutes the connector piece of the fluid line to be inserted (tubular part, hose section) which is plugged into such a coupling. Likewise, a further filter element may, for example, be connected to the socket element to enlarge the filter area.

The socket element may also have further outlet connections. Furthermore, the socket element may also be provided with a geometry (for example, a hexagon socket) which enables that a secure coupling or connection with the media line, into which the cleaned medium is to inserted, can be provided via commercially available tools. For this purpose, the socket element may be manufactured from plastic or metal.

As a further option, the socket element may also be mounted to the filter element in such a manner that said socket element is directly cast onto the filter body by a casting compound. In this instance, the sealing and attachment to the end face is carried out by the casting compound, which after curing may be comparably firm such as a conventional thermoplastic, for example, polypropylene or polyamide.

According to a further aspect of the present invention, an arrangement of filter elements is proposed, and at least two filter elements are fluidly connected in series. This ensures a segmentation of a filter section in the manner of a modular system. In doing so, the medium to be filtered flows respectively through the wall surface of a filter element, for example, from the outside to the inside. The filter elements may be rigidly or flexibly connected to one another so that an available space for installation may be used advantageously.

Advantageously, one or a plurality of filter elements may be fluidly connected or disconnected as needed. In doing so, the filter area may respectively be enlarged or reduced. In this way, particularly short-term load peaks may be taken into account when providing a system with the filtered medium.

According to a further aspect, the use of a filter element according to the present invention as an air filter and further, in particular, as a cabin air filter of a motor vehicle is proposed. The simple design and the lightweight and compact architecture may safe valuable installation space in the vehicle. The adsorbent of the filter medium, for example, activated carbon, and the possibility to combine adsorbents and/or absorbents and chemically active components with the filter medium enables not only the use in a passenger motor vehicle but also the use as a filter element in commercial vehicles, in which exposure to harmful substances has to be expected, for example, in agricultural vehicles which distribute pesticides and the like. The filter element may be easily exchanged as needed.

According to a further aspect, the use of a filter element according to the present invention as an air filter in a fuel cell system is proposed. The filter element may be easily exchanged as needed.

According to a further aspect, a filter system having a filter element according to the present invention is proposed, and the filter element has a filter body having a closed outer face surrounding a closed inner face, and the inner face encloses a central flow chamber, and at least one filter medium is situated between the outer face and the inner face, and the filter body includes, at least in sections, a wound layer having at least one adsorbent. Advantageously, such a filter system may be provided for an interior of a motor vehicle to filter inhaled air or also for a fuel cell system to filter the air supplied from the cathode side.

According to an advantageous further refinement, the filter element may be designed substantially housingless in such a manner that the filter element includes a through-flowable outside.

According to an advantageous embodiment, the adsorption filter area may be formed from a semi-finished product made up of at least one carrier plate and at least one fixed adsorbent layer having at least one adsorbent. A fixing or immobilizing of the adsorbent in the adsorbent layer prevents that the particles are swept out from the adsorption filter area.

BRIEF DESCRIPTION OF THE DRAWINGS

Further advantages result from the following description of the drawings. The drawings represent exemplary embodiments of the present invention. The drawings, the description and the claims include a plurality of combined features. The skilled person appropriately views the features also individually and further combines them in a purposeful manner.

DETAILED DESCRIPTION OF THE INVENTION

In the figures, same or similar components are referenced having the same reference characters. The figures only show examples and are not to be understood as limiting.

In the following exemplary embodiments, activated carbon is used as an adsorbent in an exemplary manner. The use of other adsorbents is, however, also conceivable (for example, zeolites, silica gels, metal oxides such as aluminum oxide, copper oxide or manganese oxide, molecular sieves such as MOFs, phyllosilicates, and nanoclays), or mixtures of adsorbents.

Figure 1:
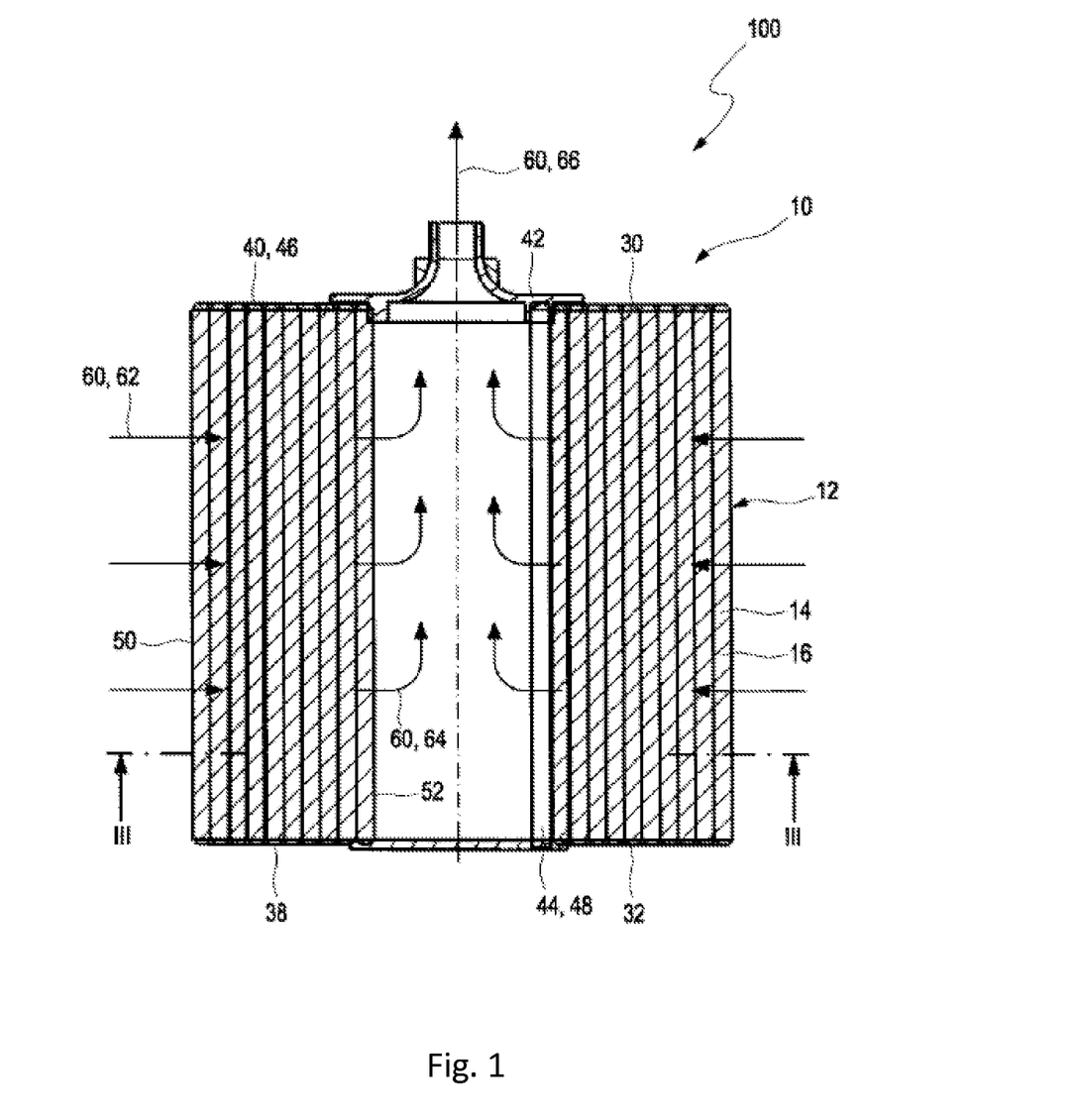
FIG. 1 shows a cross sectional view of a filter element according to one exemplary embodiment of the present invention in the form of a candle filter having a wound layer having activated carbon as an adsorbent.
Figure 2:
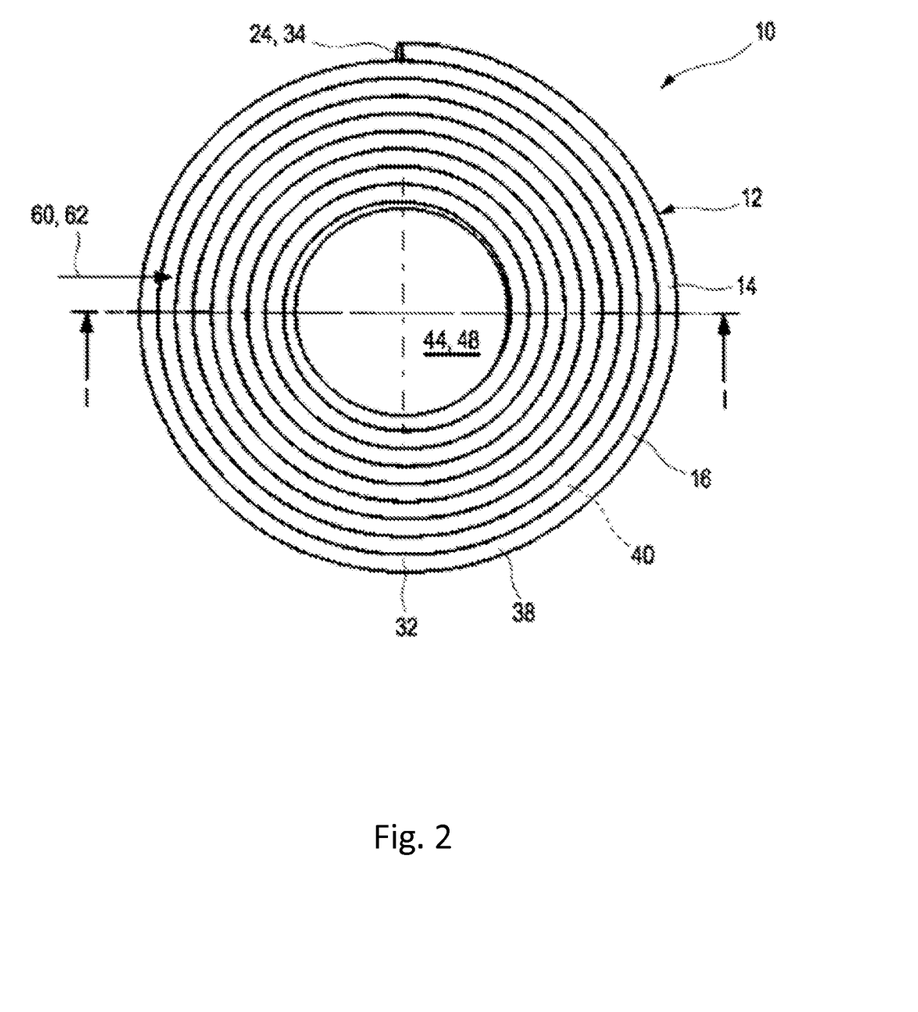
FIG. 2 shows a frontal view onto the bottom of the filter element as shown in FIG. 1.

In order to describe the present invention, FIG. 1 shows a cross sectional view of a filter element 10 according to one exemplary embodiment of the present invention in the form of a candle filter having wound activated carbon layer 14. FIG. 2 shows a frontal view onto an end face, here onto bottom 44 of filter element 10.

Filter element 10 includes a filter body 12 having a closed outer face 50 surrounding a closed inner face 52. Filter body 12 is situated between outer face 50 and inner face 52. Filter element 10 does not require a separate housing, that is, is substantially housingless so that medium 60 to be filtered, particularly air, may flow through outer face 50. The flow direction is here from outer face 50 to inner face 52; however, the flow may, in a different embodiment, also be directed from inner face 52 to outer face 50. In the shown example, ambient air 62 flows at outer face 50 into filter body 12 and discharges at inner face 52 as cleaned air 64 and leaves filter element 10 through socket element 42 as pure air 66.

At an end face 30, the filter element is provided at one end face with socket element 42 and, at the opposite lying end face 32, with a bottom plate 48 sealing the interior area of filter element 10 at bottom 44. Socket element 42 is directly attached onto filter body 12.

The end face edges of filter body 12 are provided with a sealing 38 at bottom 44 of filter element 10. Further, as it is shown in FIG. 1, the edges of filter body 12 are, at the opposite lying end face 30, sealed by an end plate 46 around socket element 42. End plate 46 may also constitute a sealing 40. Particularly during the winding process, sealings 38, 40 may be formed using, for example, hot glue or the like. For example, socket element 42 may be imbedded into sealing 40.

Figure 3:
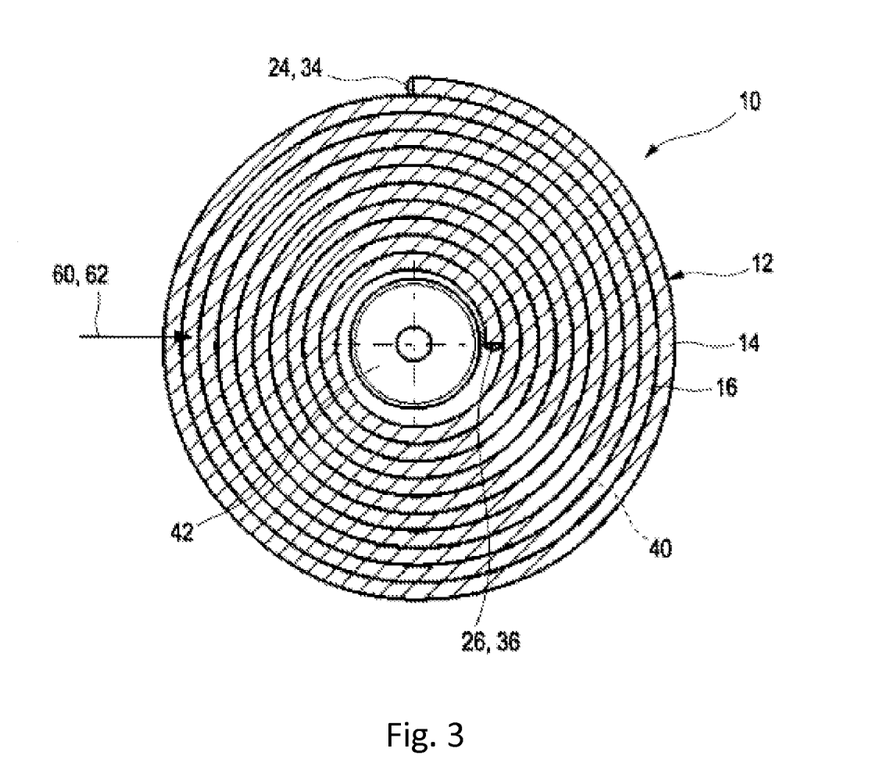
FIG. 3 shows a frontal view onto the bottom of the filter element as shown in FIG. 1 having sealing beads at the longitudinal seams as a sealing of edges of the wound activated carbon layer.

As the frontal view in FIG. 3 shows, axial edges 24, 26 of filter body 12 are sealed by a sealing 34 at outer face 50 and a sealing 36 at inner face 52. Sealings 34, 36 may be designed, for example, as sealing beads. Sealings 34, 36 may likewise be formed during the winding process. Thus, a flow of the medium 60 to be filtered through the filter element may necessarily occur only through filter body 12.

In this example, filter element 10 has a circular cross section, and filter body 12 is formed from wound layers 14 which include activated carbon. The immobilized activated carbon (adsorbent) forms the actual filter medium 16.

Figure 4:
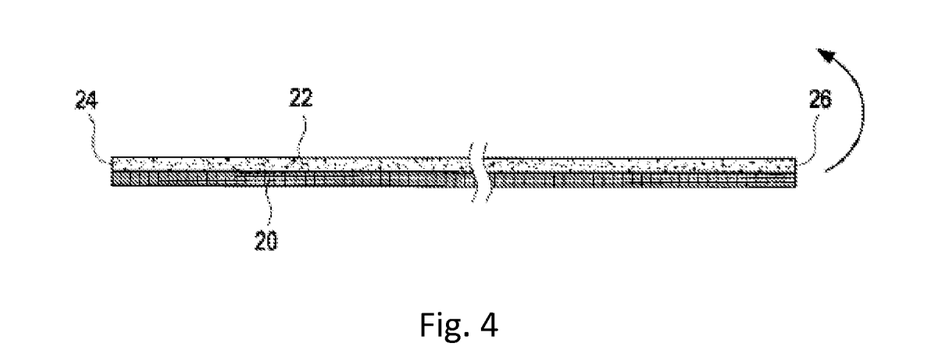
FIG. 4 shows schematically a carrier body having a layer of activated carbon particles before winding.

For this purpose, filter body 12 is formed as a winding having wound layers 14, and a layer 22 having activated carbon is applied onto carrier body 20, for example, a flat layer of fiber nonwoven fabric, and, carrier body 20 is substantially shaped as a circular cross section by winding up carrier body 20, which is indicated by a curved arrow. This is sketched in FIG. 4. In this instance, the inner diameter of filter body 12 may be specified by the diameter of a mandrel around which carrier body 20 is wound. The activated carbon is immobilized on carrier body 20 and, for this purpose, may, for example, be imbedded into an adhesive. Alternatively or additionally, layer 22 may be covered also with a further nonwoven fabric layer (not shown). In addition to activated carbon, further components may be added which specifically remove specific parts of the medium 60 to be filtered. Optionally, two coated carrier bodies 20 may be positioned on top of each other with their coated side (not shown) and be wound up.

Figure 5:
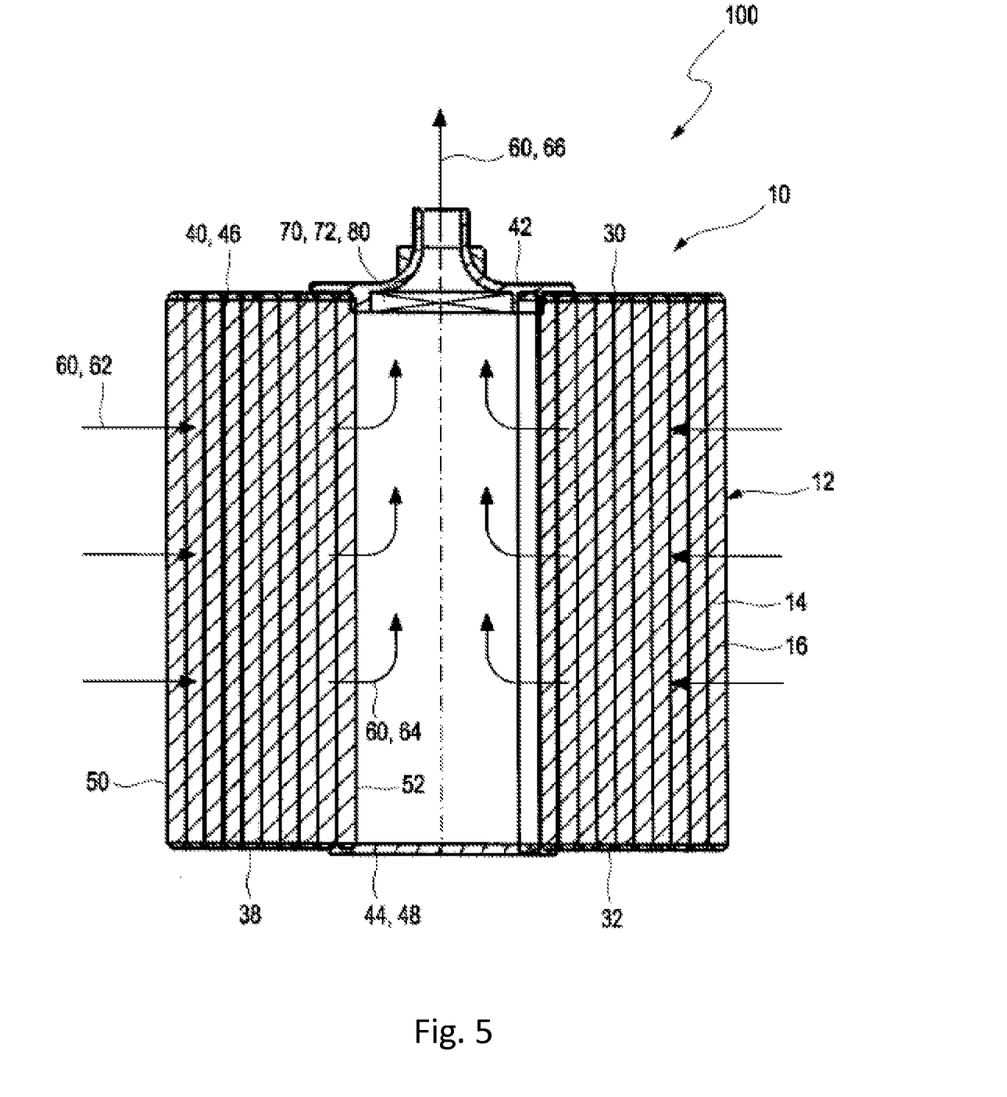
FIG. 5 shows a cross sectional view of a filter element according to one exemplary embodiment of the present invention in the form of a candle filter having a wound activated carbon layer having a particulate filter in a socket element.
Figure 6:
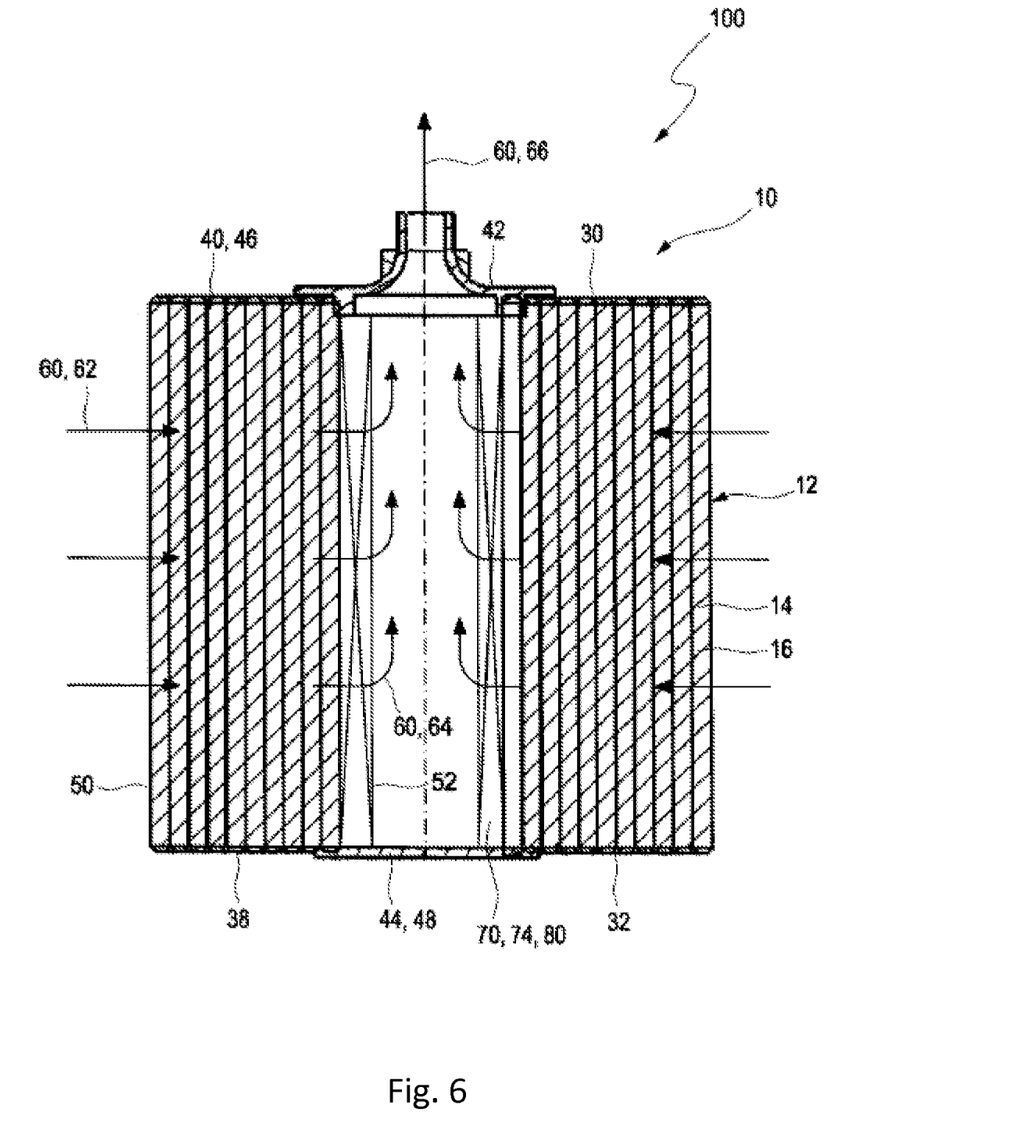
FIG. 6 shows a cross sectional view of a filter element according to one exemplary embodiment of the present invention in the form of a candle filter having a wound activated carbon layer having a particulate filter at an inner side of the filter element.
Figure 7:
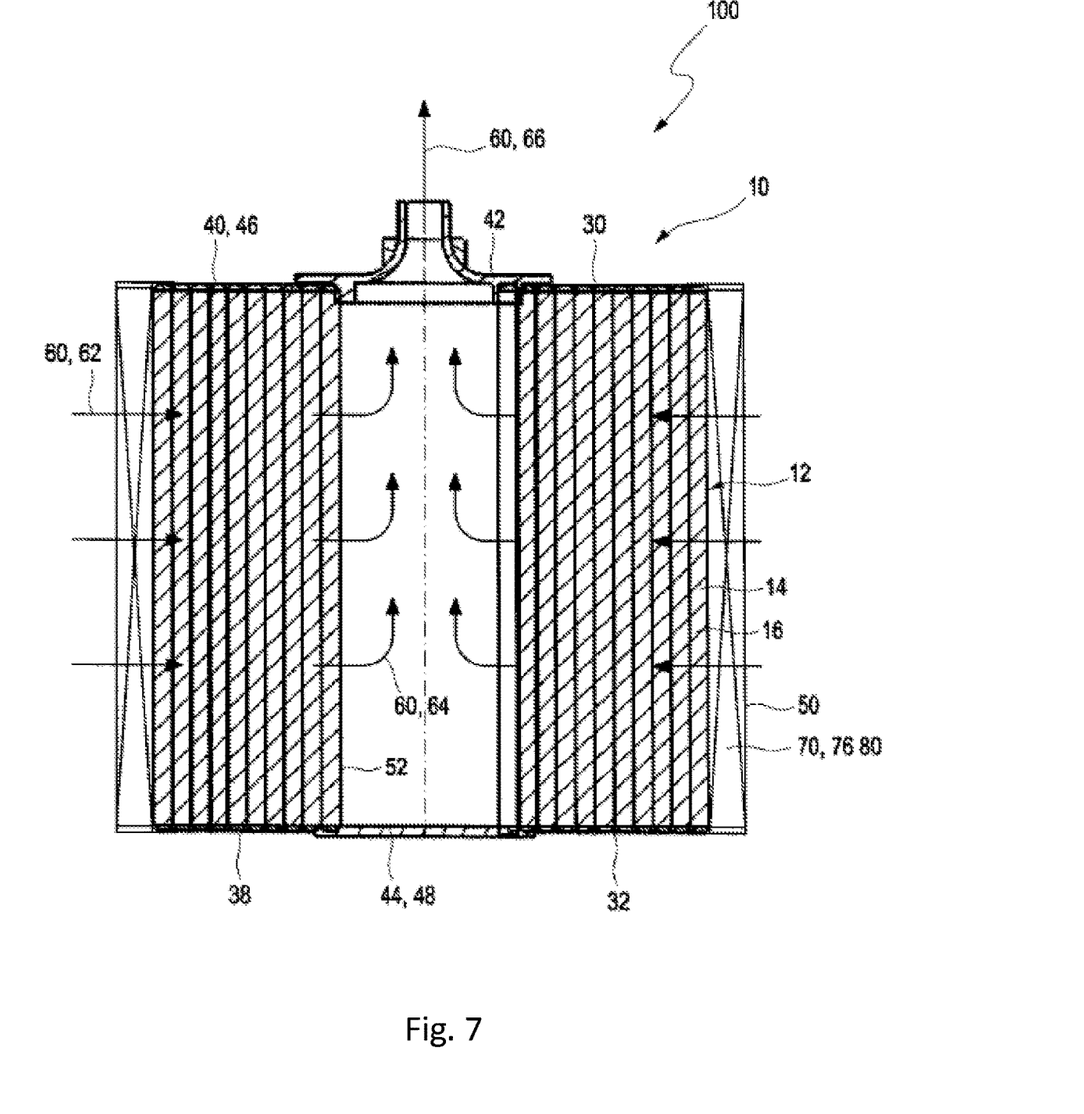
FIG. 7 shows a cross sectional view of a filter element according to one exemplary embodiment of the present invention in the form of a candle filter having a wound activated carbon layer having a particulate filter at an outer side of the filter element.

FIGS. 5 through 7 show the sectional views of a filter element 10 according to the exemplary embodiment of the present invention according to FIG. 1 in the form of a candle filter having a wound activated carbon layer in which respectively one particulate filter 70 or, additionally or alternatively, one aerosol filter 80 is shown in different locations. Advantageously, filter element 10 is situated in a filter system 100 according to the present invention, in which medium 60 to be filtered, particularly ambient air, is supplied and filtered medium 60 is discharged, particularly pure air. Filter element 10 may be easily exchanged and may be coupled to a line system (not shown) in a simple manner by way of its socket element 42, for example, by way of a quick connector.

In FIG. 5, a particulate filter 72 is situated in socket element 42. In FIG. 6, a particulate filter 74 is situated at inner face 52 of filter body 12. In FIG. 7, a particulate filter 76 is situated at outer face 50 of filter body 12. Embodiments in which such additional filters are simultaneously provided at a plurality of locations are, of course, also conceivable.

A further possibility for application is provided in that filter body 12 is inserted into a tube having a porous or a lattice-like shape and is fixedly installed directly into the intake system, for example, in an air intake system of stationary combustion system. In this instance, filter body 12 may be several meters long, which takes in air via the inner cross section. Through a porous or lattice-like center tube implemented in a rigid or flexible configuration (depending on the installation situation and length), the inner cross section may be kept stable and open for longer lengths. Such an embodiment may reduce the flow speed in the medium to be filtered and increase the capacity of the filter.

Advantageously, an exchangeable particulate filter 70 or coarse dust filter is coupled to filter element 10.

In addition to a physical mixture of two or a plurality of adsorbents, the use of two adsorbent layers separated at a boundary surface is also conceivable within one wound layer. For this purpose, mixtures out of two or a plurality of adsorbents again may be used.

In order to further improve the adsorption performance, specific materials in the form of fibers or foam may be used as carrier bodies and/or particulate filter layers. Examples are as follows: active carbon nonwoven fabric or activated carbon mats and nonwovens or foams which are impregnated with adsorbents (for example, activated carbon, zeolites, silica gels, metal oxides such as aluminum oxide, copper oxide or manganese oxide, molecular sieves such as MOFs, phyllosilicates, and nanoclays).

The simple design and the simple construction of filter element 10 achieves an increased service life and a reduced flow speed so that the filtering effect is particularly high. Free space (for example, in a chimney) may be used.

Depending on the change interval, the user may either change activated carbon filter element 10 or the particulate filter and does not have to change complete filter system 100. In addition, various filter element types (for example, filter elements having fine fibers or microfibers) may be adapted to the active carbon filter element depending on the requirement profile of the user.

The particle filtration may be taken over by a pleated filter element (not shown). Alternatively or additionally, a non-pleated coarse dust mat may be simply put over the activated carbon filter element as a round element or may be attached at the activated carbon filter element by a Velcro fastener or other gripping elements. For example, a nonwoven fabric or a semi-finished product made out of open-pored foam may be used as a coarse dust mat.

With regard to the different requirements related to volume flows and service life, the wound filter element 10 may be regarded as a modular kit which enables to react via the cylinder height and the diameter to the different require-ments by using the same connector components as a result of which tool expenses may be advantageously reduced.

An extension of the service life of filter element 10 may be achieved under conditions of air containing large amounts of particulate matter and few chemical pollutants. Immobilized adsorbent systems or adsorbent layers demonstrate advantages regarding mechanical stability and homogeneity.

Significantly higher residence times may result in a higher efficiency and, for this reason, in a lower breakthrough in filter element 10, and a higher filter capacity. Adapting the adsorption performance to the respective requirement profile and to the installation space by an appropriate selection of materials may be easily realized, for example, by varying the used material amount, that is, the used surface weight.

A combination of a plurality of adsorbents is possible through defined wound layers, and a placement on the inflow side or the outflow side enables an adaptation to a sorption kinetics of specific target gases. Since activated carbon has a certain selectivity during adsorption, not all relevant harmful gases are equally well received, in particular, complex gas mixtures as they occur in reality. Moreover, other substances for which the activated carbon has a greater affinity may supplant already adsorbed molecules. These effects may be compensated by using specialized adsorbents. Relevant material groups for this purpose are zeolites, silica gels, aluminum oxide and other porous metal oxides (for example, copper oxide and manganese oxide) and molecular sieves (for example, MOFs, phyllosilicates and nanoclays). The individual adaptation of the adsorption performance to the requirements for specific gases are further advantages when using different adsorbents. When using adsorbents which chemically bind harmful gases, a later desorption of the harmful gases may be prevented. A specific spatial arrangement of the materials in the wound layers enables to exploit further advantageous effects. For example, the first wound layer of filter element 10 may function as a protective layer in that a specialized material having a high affinity and capacity for a gas A is used. Hence, the underlying wound layers (for example, activated carbon having a good broad effect) are protected from gas A improving the adsorption efficiency for a gas B (similar to gas A) because pores are not blocked by gas A and, for this reason, two molecule types are not competing for equally large pores in the activated carbon.

A respective mixture theoretically enables that any number of materials is accommodated in one single wound layer. In this way, the adsorption performance may be adapted to the requirements when the installation space is optimally used.

Pleated particulate filters optionally possible increase, as pre-filters, the service life of filter element 10 or, as a downstream connected safety element ("police filter"), minimize the contamination of the system to be protected (for example, the discharge of adsorption particles such as activated carbon dust).

Figure 8:
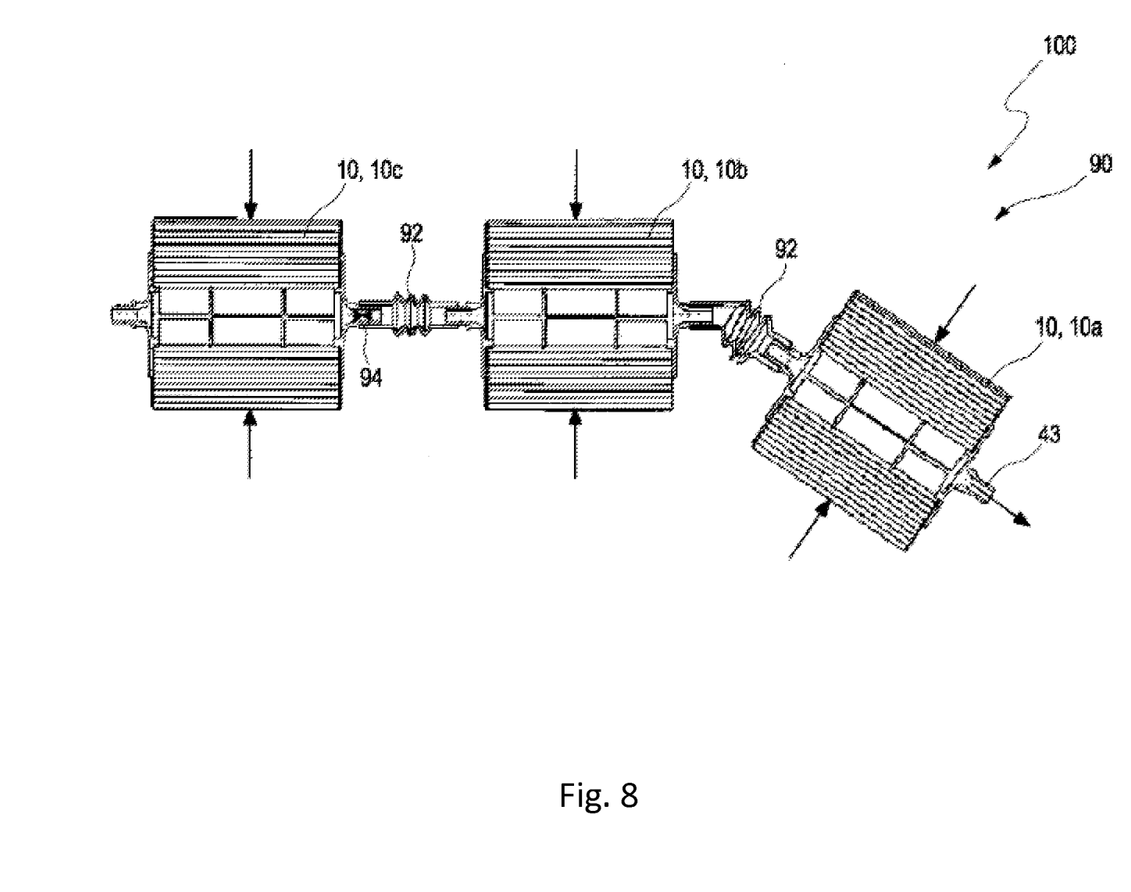
FIG. 8 shows schematically a row of coupled filter elements.

FIG. 8 shows an advantageous arrangement 90 in the form of a series connection of a plurality of filter elements 10, the example here showing three filter elements 10a, 10b, and 10c. Such an arrangement is particularly advantageous for filter system 100, which has long filter sections and/or high media flow.

Such a series connection of short filter elements 10 enables the use of the installation space more effectively; a plurality n, however, at least two individual filter elements 10, are connected by connecting pieces 92, and connecting pieces 92 are advantageously flexibly designed, for example, as a bellow. In doing so, the complete filter arrangement 90 adapts to the installation space.

The flexible connection piece 92 may also be a fixed component of socket element 32 (FIGS. 1, 5, 6, 7) or represent said component. The flexibility may be achieved by the used material for connection piece 92 itself or by a defined geometric form, for example, a bellow. Dividing the entire air stream into n-segments or filter elements 10 results in the possibility to reduce the line cross section with increasing distance from the outlet of arrangement 90.

The acoustic of the air intake section may be positively influenced by acoustic measures integrated into connection pieces 92 which are known per se, for example, lambda quarter-wave tubes, resonators or other noise-reducing measures. Moreover, sensors (not shown) may be provided at least in part in and/or between filter elements 10, for example, temperature sensors, flow speed sensors, gas sensors, humidity sensors, pressure sensors, etc.

Depending on the load conditions and the thereto related need for a filtered medium, for example, air, it is also possible to integrate control elements which ensure that a part of the filter section is disconnected. This deactivation may be carried out by an electronic control element 94 or an element which is controlled by pressure or reacts to pressure changes (for example, a vacuum box, a prestressed flap or the like).

In the shown example of three filter elements 10a, 10b, 10c forming the filter section, filter element 10c, which has the greatest distance from outlet 43 of the filter section, may be configured having less storage capacity (chemical and/or physical) because this filter element 10c is only required at load peak and peak load is not the rule regarding operating requirements.

If the pressure loss of first two filter elements 10a, 10b is too high, third filter element 10c may be connected to carry out the filter element change. Connecting or disconnecting is also advantageous in the case of a temporary, heavy harmful gas burden because the disconnected filter area of filter element 10c may be connected in this instance and, thus, reduce the flow speed in the individual filter elements 10a, 10b, 10c under the same load. In doing so, the residence time and, thus, the contact probability of the harmful gases is increased in the filter element leading to an increased separation of the harmful gases.

Of course, more than one filter element 10 may be connected as needed, particularly then when more than three filter elements 10 are connected in series. Appropriately, filter elements 10 at the end of the series connection, which are at a distance from the outlet of the series connection, may be connected and/or disconnected.

Figure 9:
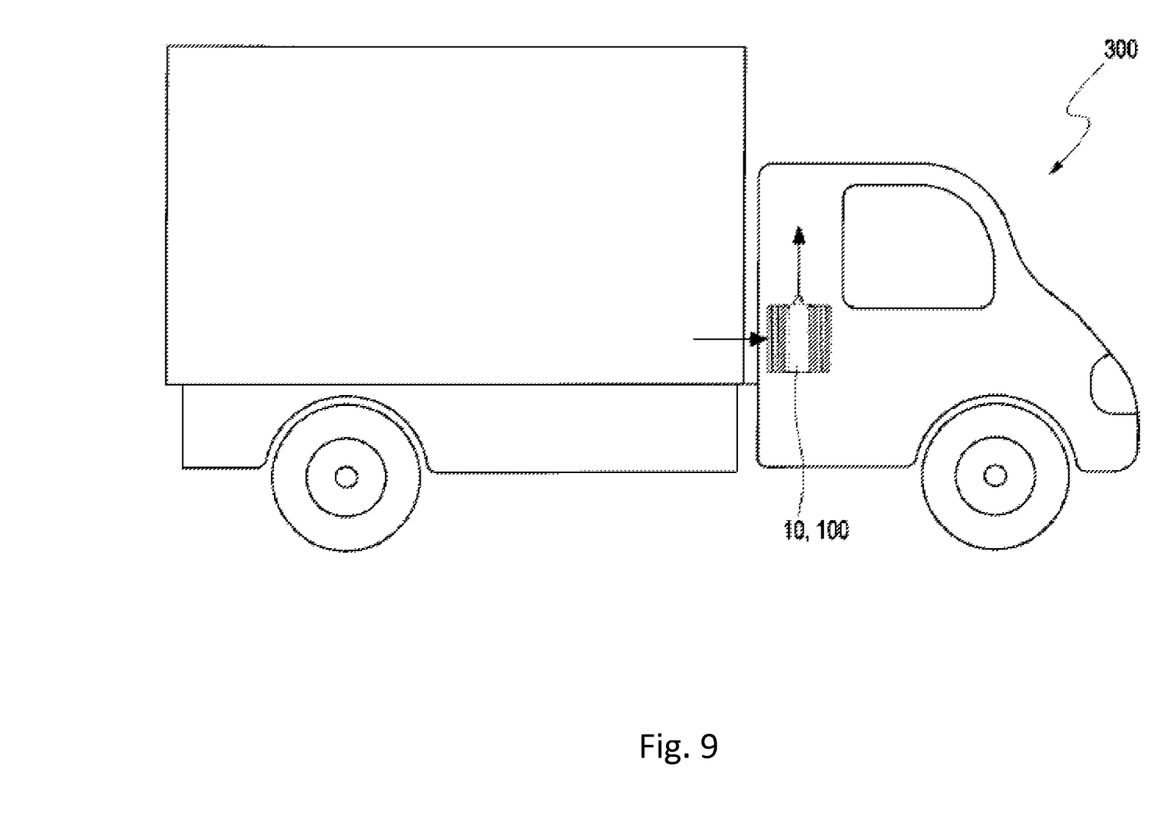
FIG. 9 shows schematically a motor vehicle having a filter system as a cabin filter.

Particularly advantageous is the use of a filter system 100 or filter element 10 according to the present invention as an air filter, in particular, as a cabin air filter of a motor vehicle 300 as indicated in a simplified manner in FIG. 9. Ambient air is taken in, guided through filter system 100, in doing so, cleaned by filter element 10 and emitted in the interior of vehicle 300. In this instance, filter element 10 may be easily exchanged. If applicable, the filter element may be coupled to one or a plurality of separate particle filters and/or aerosol filters which, for example, may be exchanged separately if needed.

Figure 10:
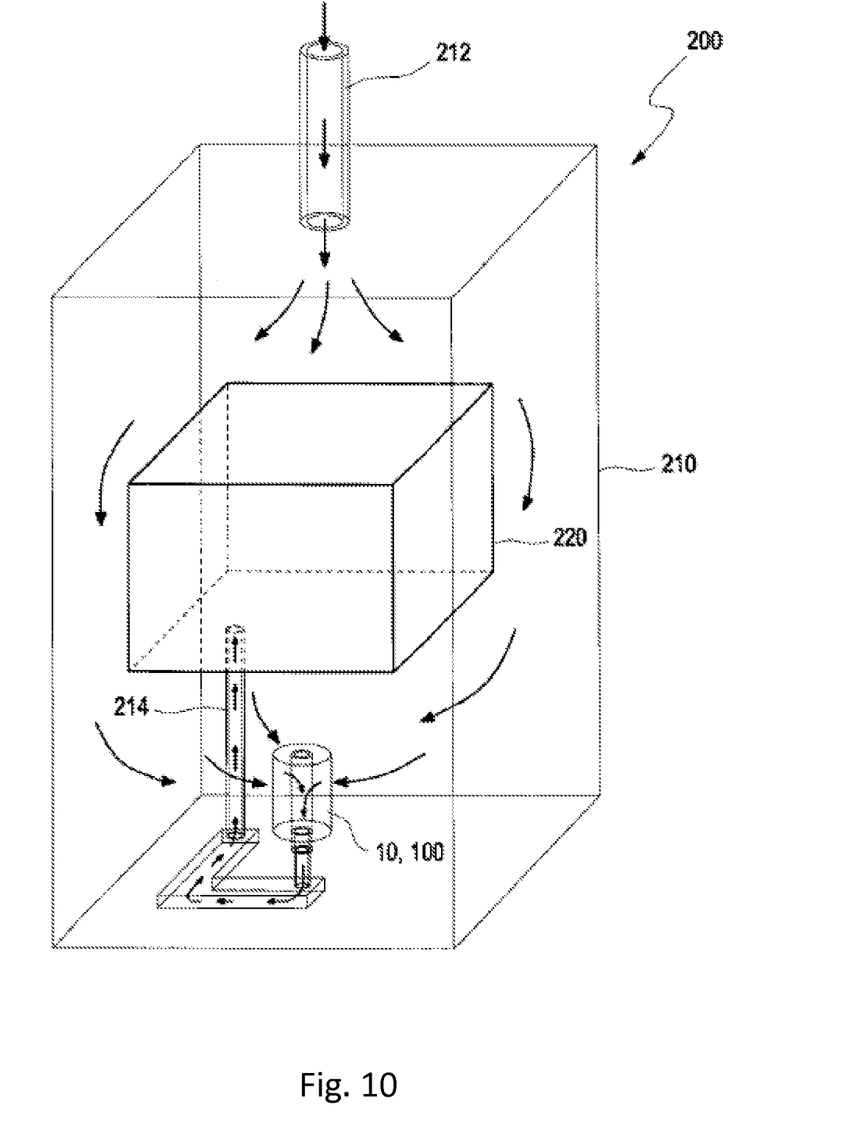
FIG. 10 shows schematically a fuel cell system having a filter system in an air supply to a fuel cell stack.

FIG. 10 shows schematically a fuel cell system 200 having a filter system 100 in an air supply 212, 214 to a fuel cell stack 220. Fuel cell system 200 is only outlined schematically; typical components known to the skilled person are not embodied. Fuel cell system 200 is shown having a housing 210 into which the air enters via air supply 212 and is supplied as cathode air via filter system 100 and thereto connected air supply 214 to fuel cell stack 220.

A separate housing is not necessary for filter element 10. In this instance, filter element 10 serves as a cathode air filter and may, for example, have a coarse dust mat for filtering particles instead of a folded (pleated) particulate filter or in addition to a particulate filter. The coarse dust mat may be designed as a foam or a nonwoven fabric mat.

The particulate filter element may be connected upstream of filter element 10 and functions as a pre-filter. The particulate filter element may also be connected downstream of filter element 10 and then functions as a so-called "police filter." If the particulate filter element is only partially suitable for filtering aerosols, it is also possible to attach, preferably behind the particulate filter element, a second filter element specifically suitable for the filtration of aerosols. A combination of pre-filter, filter element 10 and downstream safety element ("police filter") is conceivable.

The upstream particulate filter keeps away dust particles and aerosols from filter element 10 so that a premature increased pressure loss in filter element 10, caused by imbedded dust particles, is prevented. In doing so, the service life (life span) of filter element 10 is increased. The downstream particulate filter may, in addition to the dust particles and aerosols captured from the air flow, also retain activated carbon particles possibly discharging from the wound layers of filter element 10. In doing so, for example, an additional protective function for the fuel cell system is realized and any damage by particulate pollutants is prevented.

Fuel cell vehicles need an air filter on the cathode side of fuel cell stack 220, which also separates harmful gases. This is realized by a physical and chemical filter. Advantageous in this instant are activated carbon filters, filter body 10 of which is designed as a circular element having a wound layer, as it has been described previously. Owing to the large mass flow in high-capacity fuel cells (for example, 80 kW), such circular elements require very long filter bodies, which may become problematic regarding the installation space, to offer the required filtration surface and contact time, particularly in regard to filter element 10 which includes the adsorbent.

For this reason, particularly advantageous is a geometric sequencing of a plurality of filter elements 10, as described in the arrangement in FIG. 9. The geometric sequencing corresponds in terms of flow with a parallel connection of filter elements 10. Particularly advantageous for illustrating a sufficient dynamic for the cathode air supply of the fuel cell stack 220 is the possibility of activating or deactivating as needed one or a plurality of filter elements 10 at the end of the series of filter elements 10 at a distance from fuel cell stack 220 or the clean air outlet from the series of filter elements 10. If filter element 10 were illustrated as an individual filter body having wound layers for completely flowing through, for example, an 80 kW fuel cell system, it would, as a function of the service life, be very high regarding the installation space which, in turn, typically complicates the installation space situation. Furthermore, a filter system may be designed in this manner from individual filter elements 10 as a modular system, which is cost effective.

Figure 11:
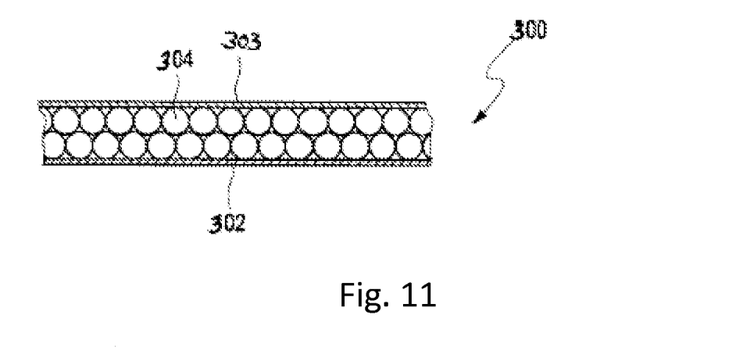
FIG. 11 shows the structure of a semi-finished product having a carrier layer and a fixed adsorbent layer.

FIG. 11 illustrates a basic structure of a semi-finished product having a layer 300 having a fixed bed of adsorbent particles including a carrier plate 302, a cover layer 303, an adsorbent layer 304, for example, in form of a fill layer, having immobilized adsorbent particles. Such a semi-finished product may be used to manufacture a winding body of a filter element.

Figure 11A:
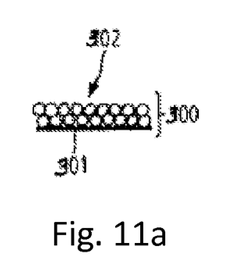
FIG. 11a shows a layer of a fixed bed of activated carbon on a carrier layer.
Figure 11B:
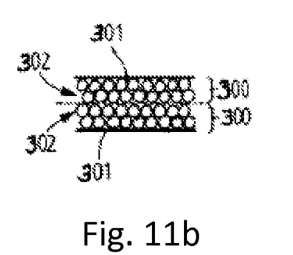
FIG. 11b shows a first embodiment of a semi-finished product of an adsorption filter layer formed from two layers according to FIG. 11.

Further possible constructions of an adsorption filter layer for a filter element according to the present invention may be concluded from FIGS. 11a-11e. FIG. 11a shows a layer 300 of a fixed bed of activated carbon particles, including a carrier layer 301 and a fill layer 302 having activated carbon particles.

Two of these layers may be connected in different ways with semi-finished products which may form an adsorption filter layer as a single layer or as multiple layers. In the embodiment according to FIG. 11b, two such layers 300 are superimposed in such a manner that fill layers 302 are lying on top of each other, and a semi-finished product is formed which on both sides is bordered by carrier elements 301. A plurality of semi-finished products may be stacked on top of each other to form a comprehensive adsorption filter layer.

Figure 11C:
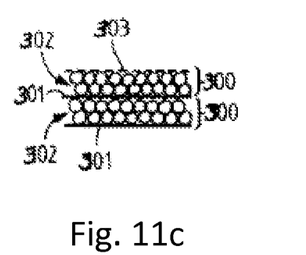
FIG. 11c shows a second embodiment of a semi-finished product formed from two layers according to FIG. 11.

In the embodiments according to FIG. 11c, two such layers 300 are superimposed in the same orientation; however, a greater number of such layers 300 may also be superimposed in such a manner. In order to form a finished adsorption filter layer, a cover layer 303 may be applied onto fill layer 302.

Figure 11D:
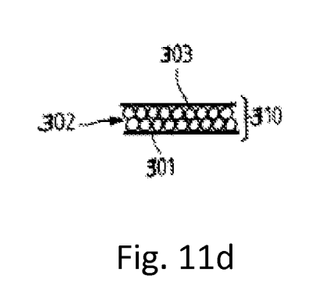
FIG. 11d shows a semi-finished product of an adsorption filter layer formed from one layer according to FIG. 11 and a cover layer.
Figure 11E:
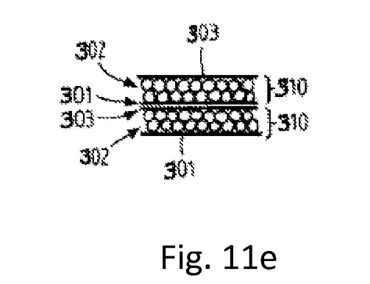
FIG. 11e shows an adsorption filter layer from two layers of a semi-finished product according to FIG. 14.

FIG. 11d shows an embodiment of a semi-fished product having a layer 302 of a fixed bed of activated carbon particles applied on a carrier layer 301 and covered by a cover layer 303. Semi-finished product 310 may form a comprehensive adsorption filter layer either as a single layer arrangement or, as shown in FIG. 11e, as a two or multiple-layer arrangement of superimposed semi-finished products 310.

In the embodiments, fill layers 302 are connect to the respective carrier and cover layers by way of fine nets of adhesive threads; however, other connection types may also be chosen.

The activation or deactivation is also advantageous in the case of high harmful gas burden, for example, in tunnels having a high degree of air impurities, because the deactivated filter area may the activated in this instance and, thus, reduce the flow speed in the individual filter elements 10 under the same load. In doing so, the residence time and, thus, the contact probability of the harmful gases increases in filter element 10 leading to an increased separation of the harmful gases.

In contrast to conventional filter elements used thus far, for example, pleated filter elements, filter elements 10 having wound layers according to the present invention offer relatively slow flow speeds and enable an advantageous, increased contact time of the medium to be filtered with the filter medium ensuring a reliable adsorption or absorption of the pollutants in filter element 10. In doing so, the functionality of filter element 10 or the filtration efficiency and also the adsorption efficiency is improved.

What is claimed is:

1. A filter element comprising:
 a filter body having
  a closed radially inner flow face enclosing a central flow chamber in an interior of the filter body;
  a closed radially outer flow face surrounding the radially inner flow face; and
  at least one filter medium situated between the radially inner flow face and the radially outer flow face, the at least one filter medium including:
   a spirally wound filter member including:
    a carrier body sheet; and
    at least one adsorbent arranged directly on and immobilized on the carrier body sheet,
    wherein the carrier body sheet is wound spirally closing about an axis multiple times such that the spirally wound carrier body sheet, due to repeated wrapping about the axis, forms a plurality of overlaid wound carrier body layers having the at least one adsorbent,
  a socket element arranged directly on and fixedly connected to axial winding edges of the spirally wound carrier body sheet and closing over the central flow chamber, the socket element including:
   a connector adapted to connect to a tubular part or hose section, the connector in fluid communication with the central flow chamber.

2. The filter element according to claim 1, wherein the carrier body, by winding up the carrier body, obtains a substantially circular cross section.

3. The filter element according to claim 1, wherein the wound layer has a sealing at its edges.

4. The filter element according to claim 3, wherein the sealing forms an end plate located at the end face.

5. The filter element according to claim 1, wherein the filter body is fluidly coupled with at least one particulate filter.

6. The filter element according to claim 1, wherein the filter body is fluidly coupled with at least one aerosol filter.

7. The filter element according to claim 1, wherein the filter element is designed substantially housingless so that the filter element includes a through-flowable outside.

8. The filter element according to claim 1, wherein the at least one adsorbent includes at least one material from the group of activated carbon, zeolites, silica gels, metal oxides, molecular sieves, phyllosilicates and nanoclays.

9. A cabin air filter of a motor vehicle, comprising at least one filter element according to claim 1 arranged on the motor vehicle,
wherein the at least one filter element receives and filters ambient air and emits filtered air into an interior of the motor vehicle.

10. A cathode air filter system of a fuel cell, comprising at least one filter element according to claim 1,
wherein the at least one filter element is connected to a cathode air supply of a fuel cell, filtering cathode air entering a fuel cell stack of the fuel cell.

11. An arrangement of filter elements, including:
at least two filter elements according to claim 1 fluidly connected in series such that the connector of the socket element of a first filter element of the at least two filter elements is connected directly or indirectly to a connector of the socket element of a second filter element of the at least two filter elements such that filtration capacity of the first and second filter elements cooperate to provide a total filtration capacity.

12. The arrangement according to claim 11, wherein one or a plurality of filter elements are configured and adapted to be fluidly connected then disconnected as needed.

* * * * *